United States Patent [19]

Scheitlin et al.

[11] E Re. 28,988

[45] Reissued Oct. 5, 1976

[54] EXHAUST GAS MANIFOLD

[75] Inventors: George E. Scheitlin, Columbus, Ind.; David R. Bentley, Toccoa, Ga.

[73] Assignee: Arvin Industries, Inc., Columbus, Ind.

[22] Filed: Mar. 20, 1974

[21] Appl. No.: 452,958

Related U.S. Patent Documents

Reissue of:

[64] Patent No.: 3,727,410
Issued: Apr. 17, 1973
Appl. No.: 204,498
Filed: Dec. 3, 1971

[52] U.S. Cl. ..... 60/322; 60/282; 60/323

[51] Int. Cl.[2] ..... F01N 7/10

[58] Field of Search ..... 60/282, 322, 323; 181/40

[56] References Cited

UNITED STATES PATENTS

| | | | |
|---|---|---|---|
| 3,413,803 | 12/1968 | Rosenlund | 60/282 |
| 3,581,494 | 6/1971 | Scheitlin | 60/323 |
| 3,633,368 | 1/1972 | Rosenlung | 60/323 |
| 3,635,031 | 1/1972 | Haddad | 60/323 |

*Primary Examiner*—Douglas Hart
*Attorney, Agent, or Firm*—Jenkins, Hanley & Coffey

[57] ABSTRACT

An exhaust gas manifold for an internal combustion engine in which there is provided an outer shell including an outer sleeve having a pair of end caps closing the ends thereof. An inner shell is carried within the outer shell and is formed by a plurality of slidably interfit inner sleeves which are supported in spaced relation to the outer sleeve on mounting members mounted on a second pair of end caps closing the ends of said inner shell and connected to said first pair of end caps. A plurality of inlet conduits and an outlet conduit are connected to said outer shell, and a plurality of inlet conduits and an outlet conduit are also connected to said inner shell with the conduits on said inner shell being carried in, and movable with respect to, the conduits on said outer shell.

8 Claims, 5 Drawing Figures

INVENTORS
GEORGE E. SCHEITLIN
DAVID R. BENTLEY
BY
Cushman, Darby & Cushman
ATTORNEYS INVENTORS
GEORGE E. SCHEITLIN
DAVID R. BENTLEY
BY
Trask, Jenkins & Hanley
ATTORNEYS

EXHAUST GAS MANIFOLD

Matter enclosed in heavy brackets [ ] appears in the original patent but forms no part of this reissue specification; matter printed in italics indicates the additions made by reissue.

BACKGROUND OF THE INVENTION

Internal combustion engines, particularly the internal combustion engines in motor vehicles, contribute a substantial amount of exhaust products to the atmosphere including substantial amounts of the oxides of nitrogen, hydrocarbons and carbon monoxide which are discharged from such engines in the exhaust gases. These pollutants when introduced into the atmosphere in sufficient quantities produce an atmospheric condition referred to as air pollution or smog.

Exhaust manifold gas temperatures will vary from 600° F. to over 1800° F. depending upon where the temperatures are measured and the engine operating conditions. If the exhaust gases are permitted to be retained in the manifold at the higher temperatures for a relatively short period of time, and mixed homogeneously with air, the unburned hydrocarbons and carbon monoxide in the exhaust gases will be oxidized to thus reduce the amount of such pollutants that are discharged from the manifold. However, with the manifold designs heretofore employed, the mass of the manifold prevents it from being brought up to a high temperature quickly to achieve such oxidation. Further, because of its mass, the manifold can not retain a large volume of the exhaust gases therein so that the gases are not retained therein for a period sufficient to achieve any significant degree of oxidation.

The present invention provides a means of obtaining a higher sensible exhaust gas temperature quickly and for increasing the dwell time of the gases in the manifold, thereby providing homogeneous mixing of the exhaust gases and air while at the same time providing a lightweight manifold construction which will be able to withstand its inherent expansion and contraction due to the elevated temperatures [.] caused by the oxidation of the smog-producing pollutants within the manifold.

SUMMARY OF THE INVENTION

In accordance with one form of the invention, there is provided an exhaust gas manifold having an outer shell formed by an elongated outer sleeve having a pair of end caps closing the opposed ends thereof. An inner shell is carried within said outer shell and is formed by a plurality of slidably interfit inner sleeves. Said inner shell is supported in spaced relation to the outer shell by pairs of mounting members carried on a second pair of end caps closing the opposed ends of said inner shell and connected to said first pair of end caps.

A plurality of inlet conduits and an outlet conduit are connected to the outer sleeve. Each of the inner sleeves has an inlet conduit connected thereto which projects outwardly through one of the inlet conduits in said plurality of inlet conduits mounted on the outer sleeve. An outlet conduit is also mounted on one of the inner sleeves and projects outwardly through the outlet conduit mounted on the outer sleeve. Each of the inlet conduits and the outlet conduit on the inner shell is disposed in spaced relation to, and is movable with respect to, its associated inlet conduit and outlet conduit on the outer sleeve.

Conveniently, thermal insulating material is interposed between the outer and inner sleeves and the inlet and outlet conduits of the inner and outer shells.

BRIEF DESCRIPTION OF THE DRAWINGS

The accompanying drawings illustrate the invention. In such drawings.

DETAILED DESCRIPTION OF THE PREFERRED EMBODIMENT

Figure 1:
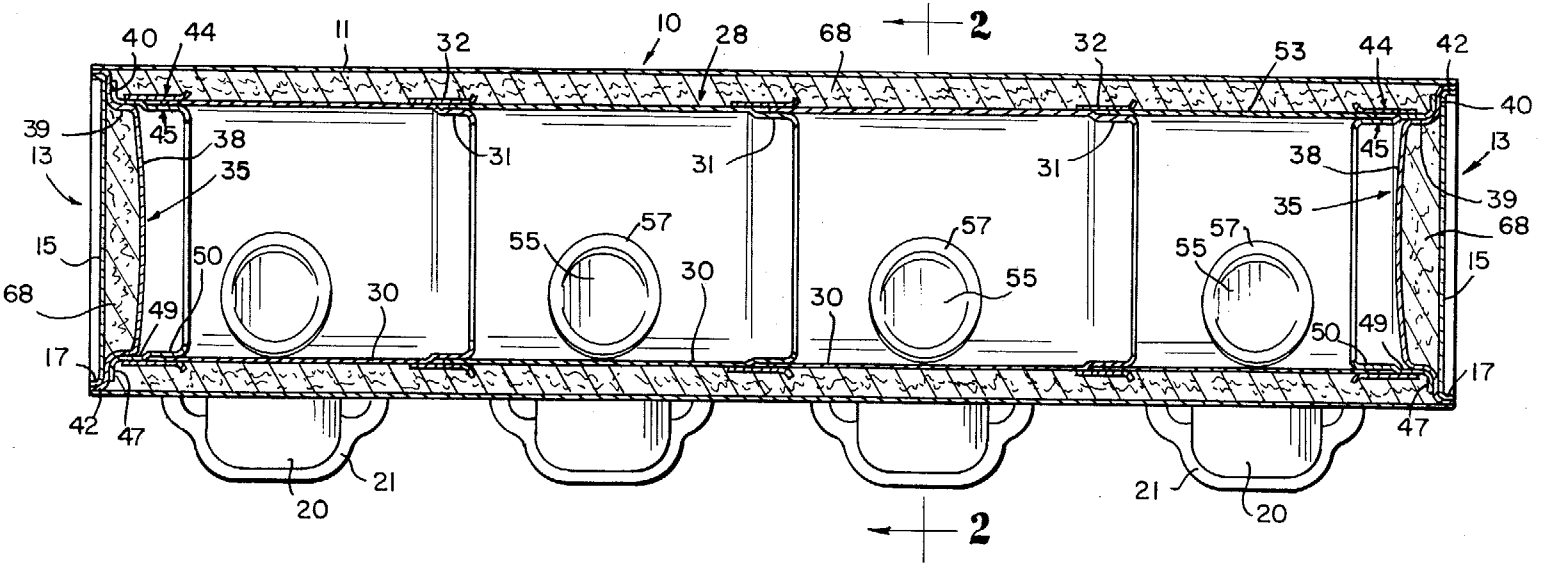
FIG. 1 is a longitudinal section of an exhaust gas manifold embodying the invention.

In the embodiment shown in FIG. 1, the manifold comprises an elongated outer sheet-metal shell 10 formed from an annular sleeve 11. Sleeve 11 is closed at its ends by a pair of end caps 13 which are identical in their construction. Each of said end caps comprises a central wall 15 disposed in a plane normal to the longitudinal axis of the manifold and terminating at its outer circumferential edge in a peripheral flange 17 concentric with the sleeve 11.

Figure 2:
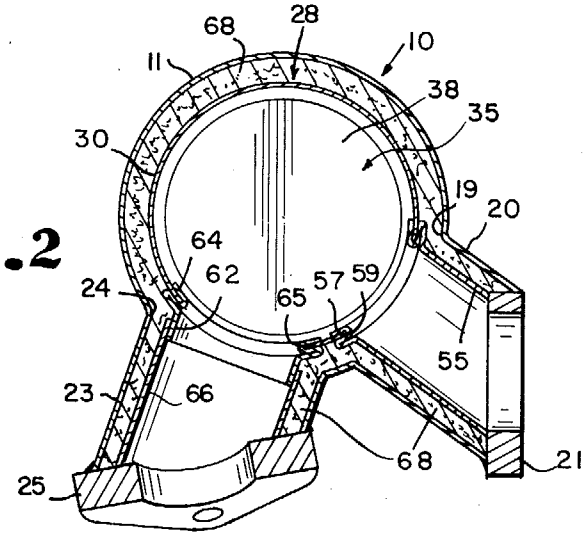
FIG. 2 is a vertical section taken on the line 2—2 of FIG. 1.

As shown in FIGS. 1 and 2, a plurality of longitudinally spaced inlet conduits 20 project outwardly from openings 19 in the sleeve 11. Each of said conduits is connected at its outer end, as by welding, to a flange 21 adapted to be connected to an exhaust port of an internal combustion engine. An outlet conduit 23 also projects outwardly from an opening 24 in the sleeve 11 and is rigidly connected at its outer end, as by welding, to a mounting flange 25 for connecting said conduit to an exhaust pipe.

Carried within the outer shell 10 is an inner sheet-metal shell 28. As shown in FIG. 1, the inner shell 28 is formed from a plurality of longitudinally extending sleeves 30. Each of said sleeves is slidably interconnected to the next adjacent sleeve by having one of its ends offset radially inwardly, as at 31. A collar 32 is mounted on the sleeve in longitudinal alignment with the offset 31 so that said collar and offset form an annular slot around one end of the sleeve in which the adjacent end of an adjacent sleeve is slidably received.

The opposed ends of the inner shell 28 are closed by a pair of identical end caps 35. Each of said end caps comprises an end wall 38 lying in a plane generally normal to the longitudinal axis of the manifold and spaced inwardly from the central wall 15 of the adjacent end cap 13. Said end wall terminates at its outer circumference in an annular wall 39 concentric with the inner sleeve. The wall 39 terminates at its outer edge in an annular web 40 radiating outwardly from wall 39 and terminating at its outer edge in an annular flange 42 interposed between the outer sleeve 11 and the flange 17 of the adjacent end cap 13. The flanges 17 and 42 are thus interconnected to each other and to the sleeve 11, as by welding, for rigidizing the inner and outer sleeves and closing the ends thereof.

Each of the end caps 35 has a pair of concentric inner and outer rings 44 and 45 mounted thereon and projecting longitudinally inwardly therefrom. As shown in FIG. 1, ring 45 has a radially extending stretch 47 at its outer end which is connected, as by welding, to the end cap web 40. The stretch 47 is integral with an inwardly projecting portion 49 which, adjacent its outer end, is welded to the end cap annular wall 39, and at its inner end, is offset radially inwardly as at 50. Thus, the ring 44 and the offset 50 in ring 45 define an annular slot. At one end of the manifold, the slot formed by the rings 44 and 45 slidably receives the adjacent end of the adjacent sleeve 30. At the opposite end of the manifold, the slot formed by rings 44 and 45 slidably receives one end of an adapter sleeve 53, the opposite end of said adapter sleeve being slidably received in the slot formed by the offset 31 and collar 32 on the adjacent inner sleeve 30. Thus, the sleeves 30 and 53 of inner shell 28 are supported in spaced relation to the outer shell 10 and are longitudinally expandable and contractable with respect to each other and with respect to said outer shell.

Each of the inner sleeves 30 and 53 has connected thereto an outwardly projecting inlet conduit 55 disposed in spaced concentric alignment with one of the outer shell inlet conduits 20. As shown in FIG. 2, each of the inlet conduits 55 is connected to its associated inner sleeve by deforming the inner end of said conduit to define an annular channel 57 which is bindingly crimped around the circumferential edge of an inlet opening 59 formed in said sleeve. The conduit 55 projects outwardly through one of the openings 19 and is rigidly connected, as by welding, to the associated mounting flange [25] *21*.

In the embodiment shown in FIG. 2, an outlet conduit 62 is mounted on one of the inner shells 30 in alignment with the outer shell outlet 23. Like the inlet conduits 55, the inner end of the outlet conduit 62 is connected to its associated inner sleeve 30 by deforming the inner end of said outlet conduit to define a channel 64 which is crimped over the circumferential edge of an oulet opening 65 formed in the associated inner sleeve 30. The conduit 62 projects outwardly through the opening 24 in abutting sliding engagement with an adapter conduit 66 disposed in concentric spaced relation to the outlet conduit 23 and rigidly connected to the mounting flange 25. Thus, both the inlet conduits 55 and the outlet conduit 62 for the inner shell 28 are movable with their associated inner sleeves and with respect to the outer shell inlets 20 and outlet 23 during expansion and contraction of the inner shell 28.

As shown in FIGS. 1 and 2, a layer of compressible thermal insulating material 68 is interposed between the inner and outer sleeves. Desirably, said insulating material is also interposed between the end walls 38 of the end caps 35 and the central walls 15 of end caps 13. It is also interposed in the spaces between the inlet and outlet conduits on said inner and outer shells.

Figure 3:
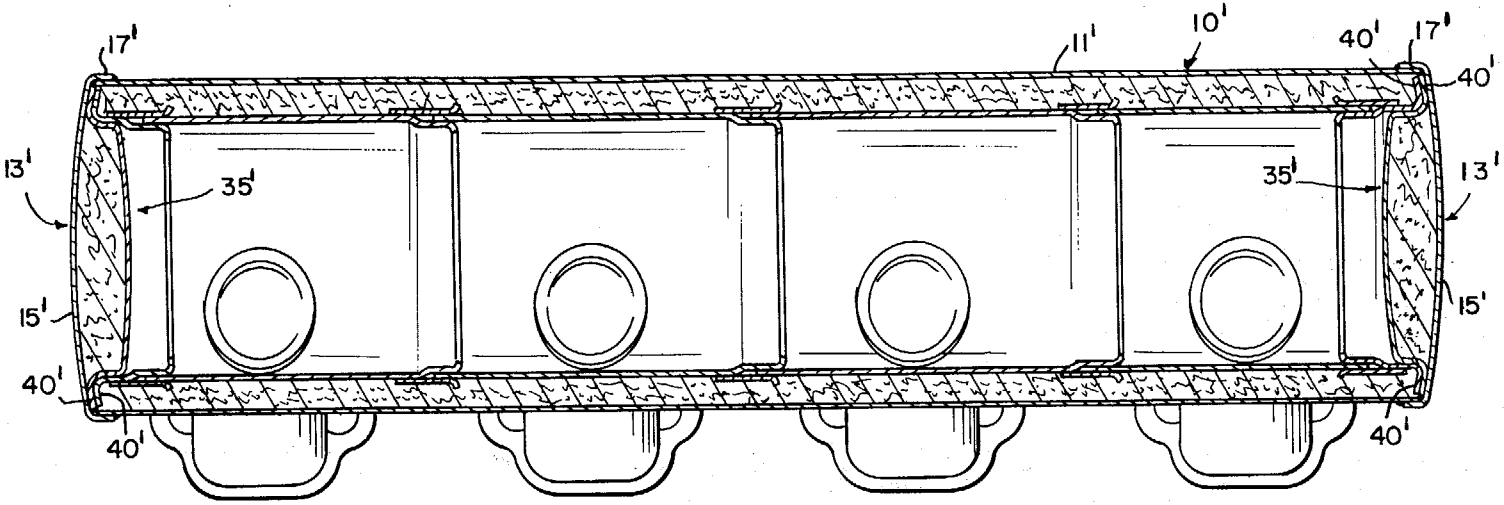
FIG. 3 is a longitudinal section showing a modified form of the manifold shown in FIG. 1.

The embodiment shown in FIG. 3 is identical in its construction with the embodiment shown in FIGS. 1 and 2 with the exception that the peripheral flange 17′ on each of the end caps 13′ extends around the outer face of the outer sleeve 11′ of shell 10′ and is rigidly connected thereto to thus dispose the central wall 15′ outwardly beyond the ends of shell 11′. The embodiment further differs from the embodiment of FIGS. 1 and 2 in that the annular sleeve 42′ on each of the end caps 35′ is omitted so that the end caps 35′ are interconnected to the outer shell 10′ by their webs 40′ which are rigidly secured to the central walls 15′ of end caps 13′.

Figure 5:
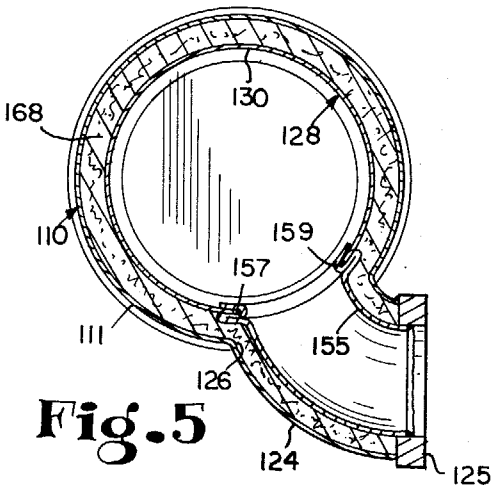
FIG. 5 is a vertical section taken on the line 5—5 of FIG. 4.
Figure 4:
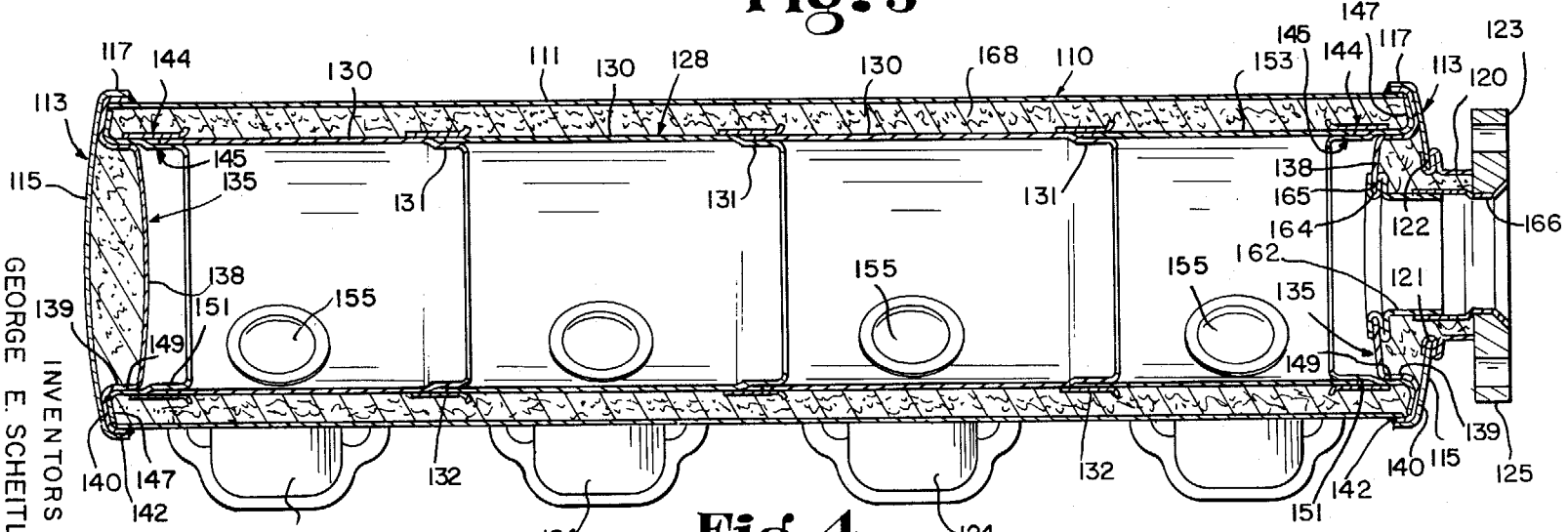
FIG. 4 is a longitudinal section of another modified form of the manifold shown in FIG. 1.

The embodiment shown in FIGS. 4 and 5 differs from the embodiments shown in FIGS. 1–3 in the construction of the end caps for the inner and outer shells and in the mounting of the outlet conduit on the manifold. Thus, the outer shell 110 comprises an elongated outer sleeve 111 closed at its ends by a pair of end caps 113 each of which comprises a central wall 115 disposed in a plane generally normal to the longitudinal axis of the manifold and terminating at its outer end in a peripheral flange 117 concentric with, and extending inwardly over, the adjacent end of the outer sleeve 111.

An outlet conduit 120 for the outer shell 110 is mounted on one of the end caps 113. To this end, the inner end of the conduit 120 is deformed to define an annular channel 121 which is bindingly crimped around an outlet opening 122 formed in the central end cap wall 115. The outer end of the conduit 120 is connected to a mounting flange 123 for connecting the manifold to an exhaust pipe. A plurality of longitudinally spaced inlet conduits 124 project outwardly from openings 126 in the sleeve 111 and are connected at their outer ends to mounting flanges 125 adapted to be connected to the exhaust ports of an internal combustion engine.

An inner shell 128 is carried within the outer shell 110, and is formed from a plurality of interfitting sleeves 130 and 153 identical in construction to the inner sleeves shown in FIGS. 1–3. Thus, each of the inner sleeves 130 is provided at one of its ends with an annular offset 131 in longitudinal alignment with a collar 132 to define an annular slot in which the adjacent end of an adjacent inner sleeve is slidably received.

The opposed ends of the shell 128 are closed by a pair of end caps 135. Each of said end caps comprises an end wall 138 disposed in a plane generally normal to the longitudinal axis of the manifold and terminating at its outer edge in an annular wall 139. The outer edge of wall 139 is continuous with a radially projecting annular web 140 which in turn is integral at its outer edge with an annular flange 142. Flange 142 is bent inwardly and interposed between the shell 111 and the flange 117 on the adjacent end cap 113. As shown, the flanges 117 and 142 are rigidly connected to the outer shell 111, as by welding.

Each of the end caps 135 has a pair of rings 144 and 145 mounted thereon and projecting inwardly therefrom. The ring 145 is provided at its outer end with a radially extending stretch 147 rigidly connected to the web 140 on its associated end cap and integrally joined to an inwardly projecting portion 149 connected to the annular wall 139 on said end cap. The inner end of the portion 149 is offset radially inwardly, as at 151, to define with the ring 144 an annular slot. Thus, the sleeve 130 at one end of the manifold is slidably carried in the slot defined by the rings 144 and 145, and the adapter sleeve 153 at the opposite end of the manifold is slidably carried in the slot defined by the pair of rings 144 and 145 at the opposite end of the manifold.

Each of the sleeves 130 and 153 is provided with an inlet conduit 155 concentrically disposed within one of the outer shell inlet conduits 124. The inner end of each of the inlet conduits 155 is deformed to define an annular channel 157 bindingly crimped around the circumferential edge of an inlet opening 159 formed in its associated inner sleeve. The conduits project outwardly through the openings 126 with their outer ends fixedly connected, as by welding, to the mounting flanges 125.

An outlet conduit 162 is mounted on one of the end caps 135. As shown in FIG. 4, the inner end of the outlet conduit 162 is deformed to define an annular channel 164 crimped around the circumferential edge of an opening 165 formed in the central wall 138 of said end cap. The conduit 162 projects outwardly through the opening 122 and is slidably carried in an adapter outlet conduit 166 whose outer end is rigidly connected, as by welding, to the mounting flange 123.

Conveniently, as with the other embodiments, compressible insulating material 168 is interposed between the inner and outer shells and between their inlet and outlet conduits.

It is contemplated that air will be introduced into the manifold, but this may be done in any convenient or desired manner, such as for example, introducing it with the exhaust gases at the various manifold inlets connected to the engine exhaust ports.

We claim:

1. An exhaust gas manifold for an internal combustion engine, comprising an outer shell formed from an outer sleeve having a first pair of end caps mounted thereon closing the ends of said outer sleeve, a plurality of slidably interfit inner sleeves carried within said outer sleeve, *said inner sleeves having annular inwardly projecting offsets formed thereon,* a second pair of end caps connected to said outer sleeve and said first pair of end caps, means mounted on said second pair of end caps and slidably interconnected to the outer ends of the outermost pair of said inner sleeves for supporting said inner sleeves in spaced relation to said outer sleeve, a first outlet conduit connected to said outer shell and projecting outwardly therefrom, a second outlet conduit in open communication with said inner sleeves carried in said first outlet conduit and movable with respect to said first outlet conduit, a plurality of longitudinally spaced first inlet conduits connected to said outer shell and projecting outwardly therefrom, and a plurality of second inlet conduits fixedly connected to said inner sleeves in open communication therewith [slidably] carried in said first inlet conduits *in spaced relation thereto* and movable with respect to said first inlet conduits.

2. An exhaust gas manifold as set forth in claim 1 with the addition that [a collar] *an adapter conduit* is mounted in said first outlet conduit, and said second [inlet] *outlet* conduit is slidably supported in said [collar] *adapter conduit.*

3. An exhaust gas manifold as set forth in claim 1 in which said first inlet and outlet conduits are mounted on said outer sleeve, and said second inlet and outlet conduits are mounted on said inner sleeves and project outwardly through openings in said outer sleeve for reception in said first inlet and outlet conduits.

4. An exhaust gas manifold as set forth in claim 1 in which said first outlet conduit is mounted on one of said first pair of end caps, said second outlet conduit is mounted on one of said second pair of end caps and projects outwardly through an opening in said one of said first pair of end caps for reception in said first outlet conduit, said first inlet conduits are mounted on said outer sleeve, and said second inlet conduits are mounted on said inner sleeves and project outwardly through openings in said outer sleeve for reception in said first inlet conduits.

5. An exhaust gas manifold as set forth in claim 2 in which each of said first end caps has a central wall in a plane normal to the longitudinal axis of said outer sleeve and integral with a peripheral flange parallel with said outer sleeve, and each of said second pair of end caps comprises an end wall in a plane generally normal to said longitudinal axis and integral with an annular wall parallel with said longitudinal axis, an annular radially extending web parallel with said end wall and connected at one of its ends to said annular wall and at its opposite end to an annular flange parallel with said peripheral flange, the webs on said second end caps abut and are rigidly connected to the adjacent portion of the central walls on said first end caps and the annular flanges on said second end caps abut and are rigidly connected to said outer sleeve and said peripheral flanges on said first end caps.

6. An exhaust gas manifold for an internal combustion engine, comprising an outer shell formed from an outer sleeve having a first pair of end caps mounted thereon closing the ends of said outer sleeve, a plurality of slidably interfit inner sleeves carried within said outer sleeve, a second pair of end caps connected adjacent their periphery to said outer sleeve and first pair of end caps, each of said second pair of end caps having its central portion offset inwardly toward the center of the manifold, means mounted on said central portion of said second pair of end caps and slidably interconnected to the outer ends of the outermost pair of said inner sleeves for supporting said inner sleeves in spaced relation to said outer sleeve, a first outlet conduit connected to said outer shell and projecting outwardly therefrom, a second outlet conduit in open communication with said inner sleeves carried in said first outlet conduit and movable with respect to said first outlet conduit, a plurality of longitudinally spaced first inlet conduits connected to said outer shell and projecting outwardly therefrom, and a plurality of second inlet conduits fixedly connected to said inner sleeves in open communication therewith [slidably] carried in said first inlet conduits *in spaced relation thereto* and movable with respect to said first inlet conduits.

7. An exhaust gas manifold as set forth in claim 5 in which said means for supporting the inner sleeves comprises two pairs of rings with the rings in each pair having their outer ends rigidly interconnected to said annular wall on one of said second end caps and their inner ends projecting inwardly therefrom, the inner ends of said rings in each pair being spaced apart and received over the end of the adjacent inner sleeve for slidably supporting said adjacent inner sleeve.

8. An exhaust gas manifold as set forth in claim 5 in which first and second outlet conduits, said first and second inlet conduits, said inner and outer sleeves, and the central portions of said first and second pairs of end caps are each spaced from each other and a compressible insulation is carried in said spaces.

* * * * *